(12) United States Patent
Koyama et al.

(10) Patent No.: US 11,697,233 B2
(45) Date of Patent: Jul. 11, 2023

(54) COMPOSITE

(71) Applicant: NISSAN MOTOR CO., LTD., Yokohama (JP)

(72) Inventors: Masaki Koyama, Kanagawa (JP); Takashi Oda, Kanagawa (JP); Katsumi Morohoshi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/253,268

(22) PCT Filed: Jun. 26, 2018

(86) PCT No.: PCT/JP2018/024209
§ 371 (c)(1),
(2) Date: Dec. 17, 2020

(87) PCT Pub. No.: WO2020/003382
PCT Pub. Date: Jan. 2, 2020

(65) Prior Publication Data
US 2021/0178644 A1      Jun. 17, 2021

(51) Int. Cl.
*B32B 3/26*      (2006.01)
*B32B 3/30*      (2006.01)
(Continued)

(52) U.S. Cl.
CPC .... *B29C 45/14311* (2013.01); *B29C 37/0085* (2013.01); *B29C 45/14631* (2013.01);
(Continued)

(58) Field of Classification Search
CPC .. B32B 3/266; B32B 3/30; B32B 7/04; B32B 15/08; B32B 2250/02; B32B 2262/106;
(Continued)

(56) References Cited

U.S. PATENT DOCUMENTS

| | | | |
|---|---|---|---|
| 2011/0057392 A1* | 3/2011 | Monnet | B62D 29/002 277/637 |
| 2011/0277911 A1* | 11/2011 | Allen | B62D 29/002 181/284 |

(Continued)

FOREIGN PATENT DOCUMENTS

| | | |
|---|---|---|
| FR | 2175673 A1 | 10/1973 |
| JP | 2015-131590 A | 7/2015 |

(Continued)

*Primary Examiner* — David Sample
*Assistant Examiner* — Donald M Flores, Jr.
(74) *Attorney, Agent, or Firm* — Foley & Lardner LLP

(57) ABSTRACT

Provided is a composite (A) including a metal plate (B) and a reinforcing member (C) that is made of a resin. The metal plate (B) includes a joint portion (2) that is continuous with one end of a body portion (1), a hole that is formed through the body portion (1) in a thickness direction of the body portion (1) in the proximity of the joint portion (2), and a guide portion provided around the hole. The reinforcing member (C) continuously includes a main portion (5), a coupling portion (6) formed in the hole (3), and a locking portion (7) that is held in close contact with a surface on another side of the body portion (1). The guide portion (4) is at least one of a protruding portion provided on at least one of a rear side and a lateral side relative to the hole (3) in a direction from the body portion (1) to the joint portion (2), and a recessed portion extended from a front side relative to the hole (3) to the hole (3) in the direction from the body portion to the joint portion. In insert molding of the composite (A), a molten resin is introduced preferentially into the hole (3). With this, the joint portion (2) is formed reliably in good condition free from adhesion of the resin.

17 Claims, 23 Drawing Sheets

(51) Int. Cl.
　　　*B32B 7/04*　　(2019.01)
　　　*B32B 15/08*　　(2006.01)
　　　*B29C 45/14*　　(2006.01)
　　　*B29C 37/00*　　(2006.01)
　　　*B29C 70/78*　　(2006.01)
　　　*B29K 101/12*　　(2006.01)
　　　*B29K 307/04*　　(2006.01)
　　　*B62D 29/00*　　(2006.01)

(52) U.S. Cl.
　　　CPC .............. *B29C 70/78* (2013.01); *B32B 3/266* (2013.01); *B32B 3/30* (2013.01); *B32B 7/04* (2013.01); *B32B 15/08* (2013.01); *B29C 2045/14327* (2013.01); *B29K 2101/12* (2013.01); *B29K 2307/04* (2013.01); *B32B 2250/02* (2013.01); *B32B 2262/106* (2013.01); *B62D 29/004* (2013.01); *Y10T 428/24281* (2015.01); *Y10T 428/24289* (2015.01); *Y10T 428/24298* (2015.01)

(58) Field of Classification Search
CPC ..... Y10T 428/24281; Y10T 428/24289; Y10T 428/24298
See application file for complete search history.

(56) References Cited

U.S. PATENT DOCUMENTS

2015/0197289 A1\* 7/2015 Kurokawa ........... B62D 29/004
　　　　　　　　　　　　　　　　　　　296/187.08
2016/0016359 A1\* 1/2016 Kondo .................... B29C 70/68
　　　　　　　　　　　　　　　　　　　428/139

FOREIGN PATENT DOCUMENTS

JP　　　　2015-131590 A　　7/2015
WO　　WO 2014/142189 A1　　9/2014

\* cited by examiner

COMPOSITE

TECHNICAL FIELD

The present invention relates to a composite having a layered structure including a metal plate and a reinforcing member that is made of a resin and is provided on a surface on one side of the metal plate. Specifically, the present invention relates to a composite to be used as a vehicle component such as a vehicle body panel or a frame member of an automobile.

BACKGROUND ART

As an example of composites in the related art, there may be mentioned a composite disclosed in Patent Literature 1. The composite disclosed in Patent Literature 1 includes a metal frame member to be formed of a plurality of wall portions into a closed cross-sectional shape, and a reinforcing member formed of a fiber reinforced resin charged in the frame member. Opening portions are formed through at least some wall portions of the plurality of wall portions of the frame member. Meanwhile, the reinforcing member includes insertion portions inserted through the opening portions, and engaging portions respectively including locking portions each having an area larger than the corresponding opening portions. These engaging portions are arranged at a plurality of positions in the frame member.

This composite is manufactured by insert molding. Specifically, the frame member is set in a mold, and a resin being a material of the reinforcing member is charged into the mold, whereby the frame member and the reinforcing member are integrated with each other. At a time when the composite is used as a vehicle component, even when load is applied to the frame member, the reinforcing member provided in the frame member is suppressed from peeling off by the engaging portions.

The insert molding for manufacturing the composite utilizes injection compression molding or injection molding. Specifically, with regard to components that need a larger amount of resin, such as large components, the injection compression molding including supplying the resin while closing the mold is used to increase flowability of the resin. By the injection compression molding, a metal member (frame member) and the reinforcing member made of the resin are integrated with each other. In addition, for ease of joining to other members by welding, such a composite includes a joint portion as a welding part at one end of the metal member.

CITATION LIST

Patent Document

Patent Document 1: Japanese Patent Application Laid-open No. 2015-131590

SUMMARY OF INVENTION

Technical Problem

However, in manufacturing the composite in the related art as described above, depending, for example, on timing of supplying the resin into the mold, or dimensional accuracy of the metal member, the resin may leak to the joint portion and hinder the welding by being cured thereafter. Such a new problem has remained unsolved. Note that, in the insert molding, in the case where the resin leaks to the joint portion, it is significantly troublesome to remove the cured resin, and hence work for the removal is extremely difficult.

The present invention has been made in view of the above-described circumstances in the related art, and an object thereof is to provide a composite having a layered structure including a metal plate with a joint portion and a reinforcing member that is made of a resin and is provided on a surface on one side of the metal plate. Even by insert molding, the joint portion to be provided can be formed reliably in good condition free from adhesion of a resin, and the composite to be provided has sufficient rigidity.

Solution to Problem

The composite according to the present invention has a layered structure including a metal plate and a reinforcing member that is made of a resin and is provided on a surface on one side of the metal plate. The metal plate includes a body portion, a joint portion that is continuous at least with one end of the body portion, a hole that is formed through the body portion in a thickness direction of the body portion in the proximity of the joint portion, and a guide portion provided around the hole on a surface on one side of the body portion. The reinforcing member continuously includes a main portion that covers a surface on one side of the body portion, a coupling portion formed in the hole, and a locking portion that is held in close contact with a surface on another side of the body portion. In addition, in the composite, the guide portion is at least one of a protruding portion provided on at least one of a rear side and a lateral side relative to the hole in a direction from the body portion to the joint portion, and a recessed portion extending from a front side relative to the hole to the hole in the direction from the body portion to the joint portion.

In insert molding of the composite according to the present invention, the metal plate is set in a mold, and a resin being a material of the reinforcing member is supplied into the mold in a middle of closing the mold or after closing the mold. At this time, the resin is charged by being supplied from a side of the body portion of the metal plate, and by then flowing in the direction from the body portion to the joint portion.

Meanwhile, the metal plate includes, in the proximity of the joint portion of the body portion, the hole that is formed through the body portion in the thickness direction, and the guide portion. Thus, the resin to flow is introduced into the hole by the guide portion, and is allowed to flow out to a rear side of the body portion through the hole. In this way, the resin is prevented from leaking to a side of the joint portion. The resin cured thereafter serves as the reinforcing member continuously including the main portion that covers the surface on one side of the body portion of the metal plate, the coupling portion formed in the hole, and the locking portion that is held in close contact with the surface on the other side of the body portion.

In this way, even by the insert molding, the joint portion of the composite can be formed reliably in the good condition free from the adhesion of the resin, and the composite has the sufficient rigidity owing to the reinforcing member continuously including the main portion, the coupling portion, and the locking portion.

DESCRIPTION OF THE EMBODIMENTS

First Embodiment

FIG. 1 to FIG. 4 are explanatory views of a composite according to a first embodiment of the present invention.

This composite A has a layered structure including a metal plate B and a reinforcing member C that is made of a resin and is provided on a surface on one side of the metal plate B.

Note that, although the metal plate B is not particularly limited in shape, the metal plate B in the illustration has a certain continuous cross-sectional shape. Such a metal plate 5 is, for example, a member formed by bending a flat metal sheet, or a member formed into a shaped material, each of which is a member having both front and rear surfaces that are distinguishable from each other. In addition, the metal plate B need not necessarily have a uniform cross-section as a whole, and may partially have the certain continuous cross-sectional shape. Meanwhile, the resin being a material of the reinforcing member C encompasses a fiber reinforced resin (FRP). Specifically, when the composite A is a vehicle component, a carbon-fiber-reinforced thermoplastic resin (CFRTP) using carbon fiber is typically used.

Note that, hereinbelow, although description is made on a premise that relationships between a top, a bottom, a right, and a left of the composite A correspond to those in a posture in the illustration for the sake of convenience, the posture in the illustration is not necessarily a posture in practical use.

Figure 1:
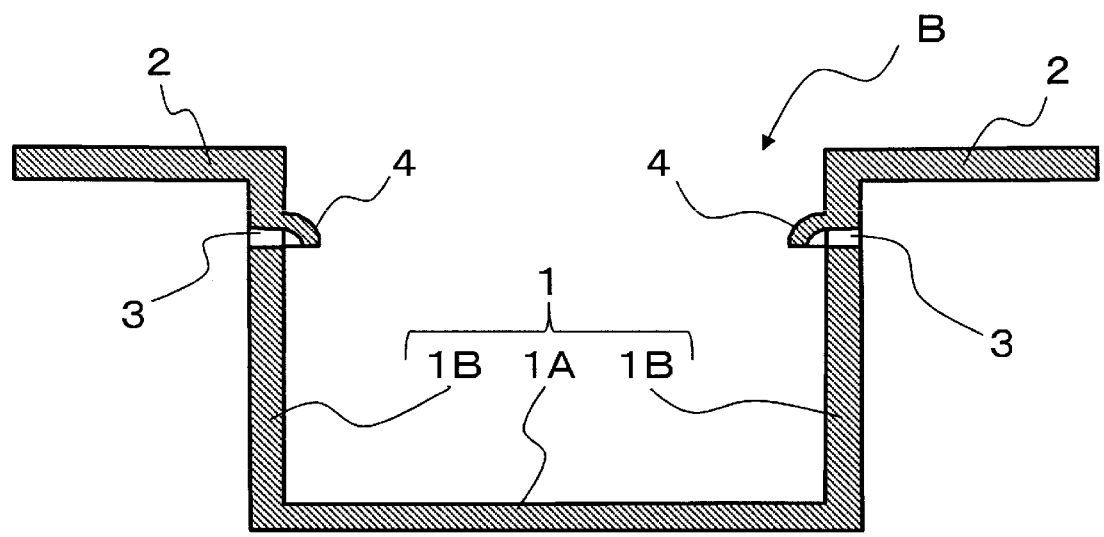
FIG. 1 is an explanatory cross-sectional view of a metal plate of a composite according to a first embodiment of the present invention.
Figure 2:
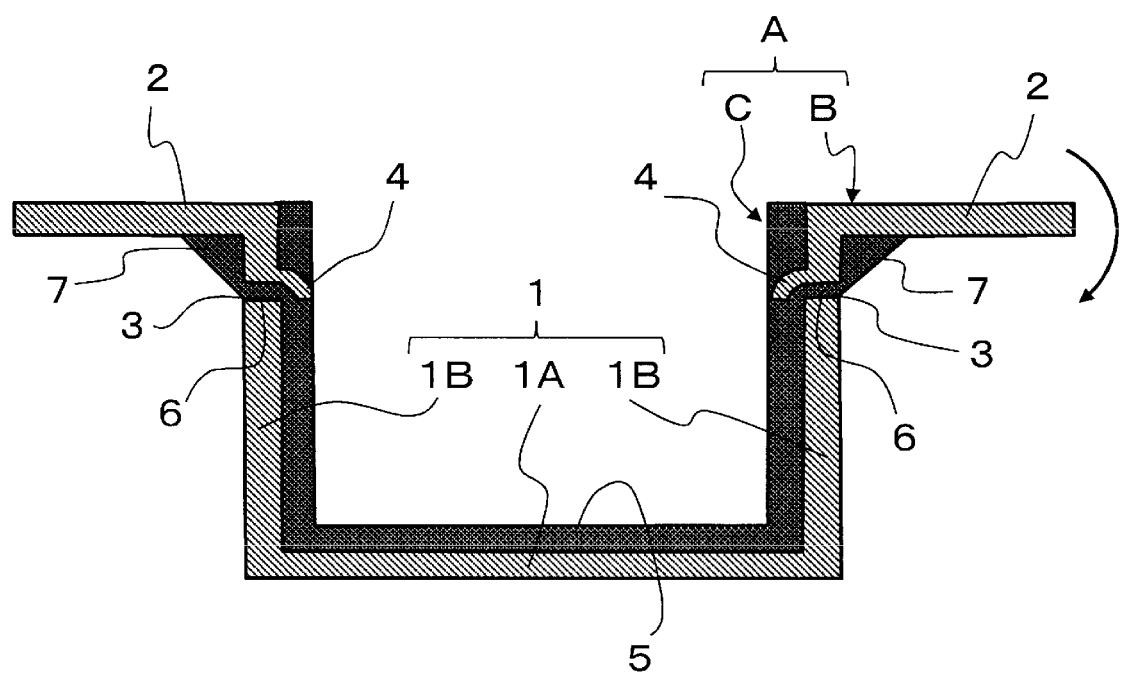
FIG. 2 is an explanatory cross-sectional view of the composite including the metal plate illustrated in FIG. 1 and a reinforcing member.

The metal plate B includes a body portion 1 and a joint portion 2 that is continuous at least with one end of the body portion 1. As illustrated in FIG. 1 and FIG. 2, in the metal plate B of this embodiment, the body portion 1 includes a horizontal bottom wall 1A, and right and left vertical walls 1B and 1B that are vertically continuous with respective end portions of the bottom wall 1A. In addition, the metal plate B includes horizontal joint portions 2 and 2 that are continuous with respective top ends of the vertical walls 1B and 1B.

In the composite A in the illustration, the reinforcing member C is provided on inner surfaces of the metal plate B, which correspond to a surface on one side of the body portion 1. Thus, both of the joint portions 2 continuously protrude, from the end portions of the body portion 1 (top ends of vertical walls 1B) to outer surfaces on the sides of the other surfaces. Both of the joint portions 2 protrude in directions opposite to each other. With this, the metal plate B has a vertically-inverted hat cross-sectional shape including substantially-perpendicular corner portions. The metal plate B has this cross-sectional shape continuously over a predetermined length.

Figure 3:
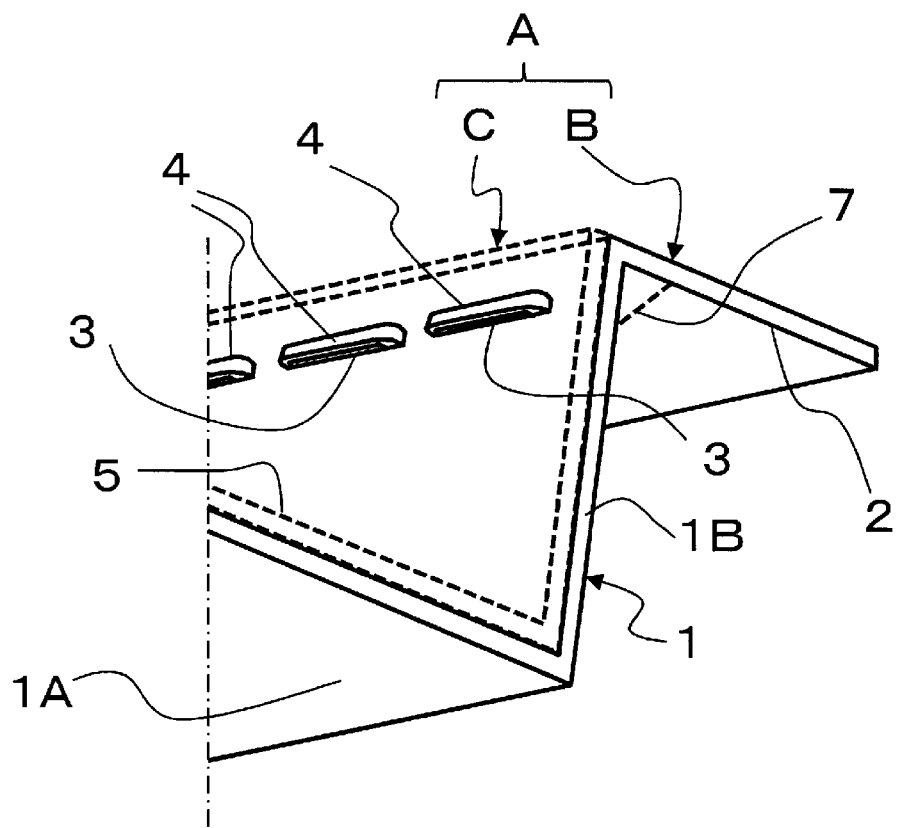
FIG. 3 is an explanatory perspective view of holes and guide portions of the composite.

In addition, the metal plate B includes holes 3 that are formed through the body portion 1 in its thickness direction in the proximity of the joint portions 2, and guide portions 4 provided around the holes 3 on the surface on the one side (inner surface) of the body portion 1. The holes 3 are provided respectively in the proximity of the joint portions 2, that is, respectively in the proximity of the top ends of the vertical walls 1B. As illustrated in FIG. 3, the holes 3 of this embodiment are each a long hole extending in a continuing direction of the cross-section of the metal plate B, and are arranged at a predetermined interval in the continuing direction of the cross-section. Note that, the continuing direction of the cross-section refers to a direction in which the certain cross-sectional shape of the metal panel 5 continues (longitudinal direction in a range of the continuation).

The guide portions 4 are each at least one of a protruding portion provided on at least one of a rear side and a lateral side relative to the hole 3 in a direction from the body portion 1 to the joint portions 2 (direction from the bottom to the top in FIG. 1 and FIG. 2), and a recessed portion extended from a front side relative to the hole 3 to the hole 3 in the same direction. The guide portions 4 of this embodiment are each a protruding portion provided on the rear side relative to the hole 3 (top side in the figures), specifically, at a position where the guide portions 4 is held in contact with a rear rim portion of the holes 3.

The protruding portion as the guide portions 4 is formed into a rib shape longer than an overall length of the hole 3 being the long hole. Specifically, the guide portions 4 each have a shape protruding to cover the hole 3 on the surface on one side of the body portion 1 and opened downward. The holes 3 and the guide portions 4 can be formed by press working.

The reinforcing member C continuously includes a main portion 5 that covers the surface on one side (inner surface) of the body portion 1 of the metal plate B, coupling portions 6 formed respectively in the holes 3, and locking portions 7 that are held in close contact with the body portion 1 on the surfaces on the other side (outer surfaces) of the body portion 1.

Figure 4:
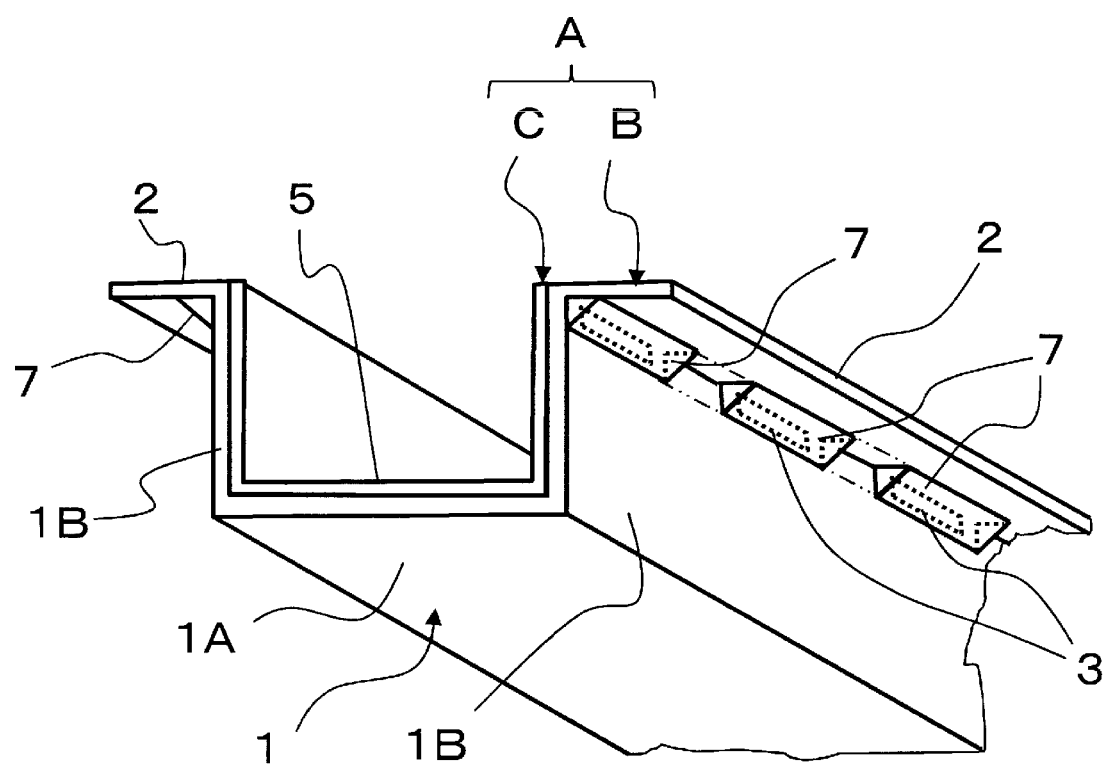
FIG. 4 is a perspective view of the composite.

The locking portions 7 in the illustration are each formed in an internal-angle region being a boundary region between the body portion 1 and the joint portions 2 because the joint portions 2 are each perpendicular to the body portion 1 of the metal plate B. Further, as illustrated in FIG. 4, the locking portions 7 are formed on respective outsides of the holes 3. Still further, the locking portions 7 each have a triangular cross-sectional shape with two sides corresponding respectively to the body portion 1 side of the metal plate B and the joint portions 2 side of the same.

Figure 5:
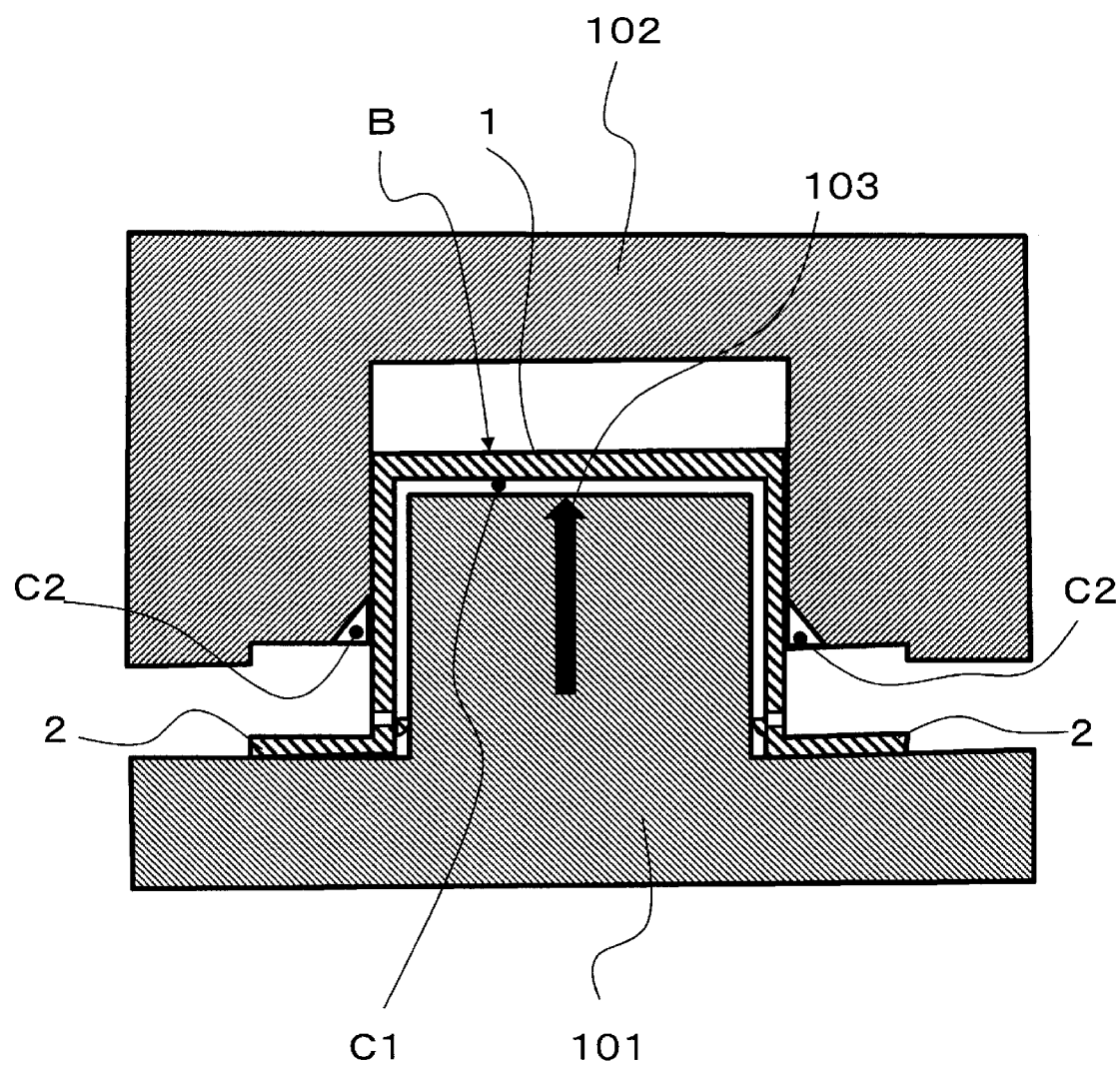
FIG. 5 is a cross-sectional view illustrating a state in the middle of closing a mold of a molding apparatus for the composite.
Figure 6:
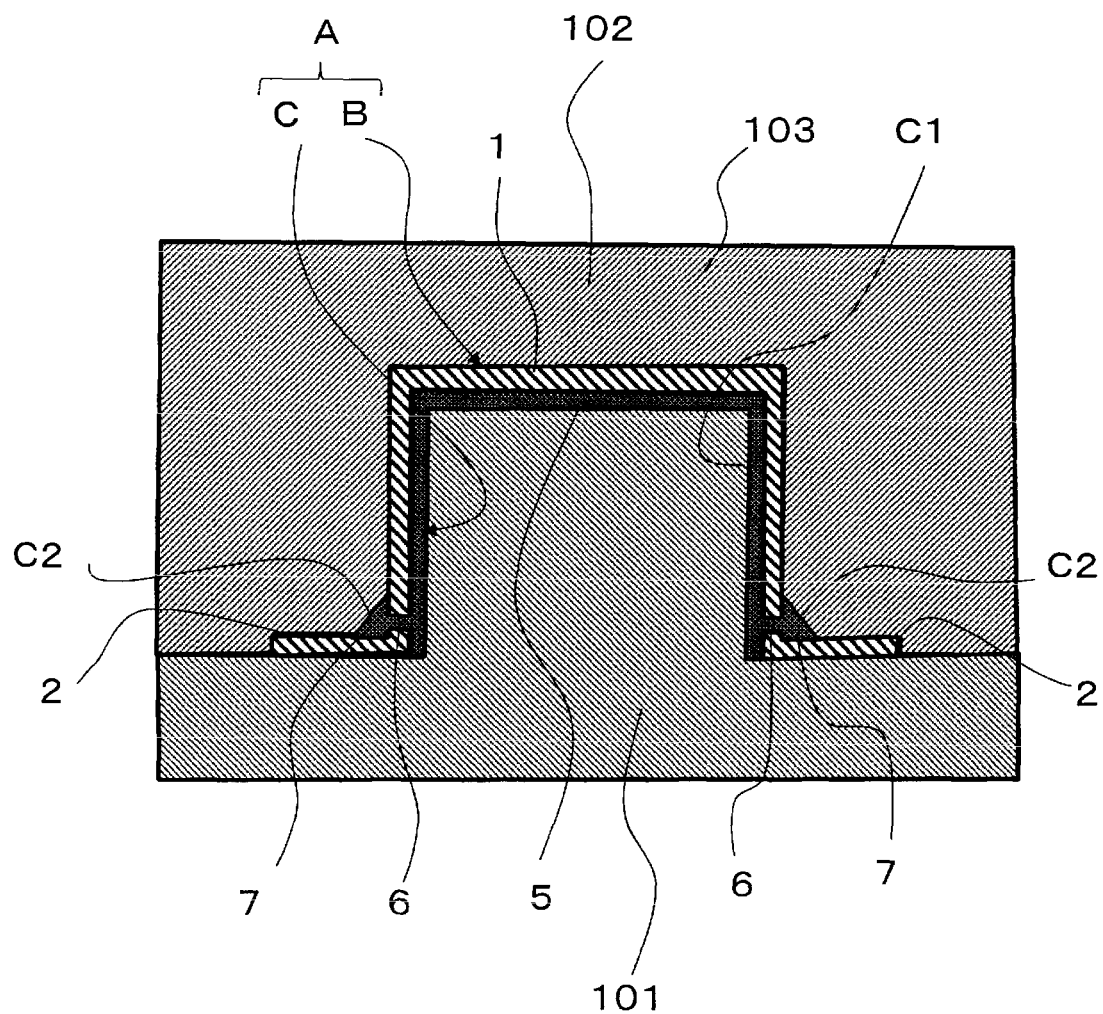
FIG. 6 is a cross-sectional view illustrating a state in which the mold in the state illustrated in FIG. 5 is closed.

FIG. 5 and FIG. 6 are explanatory views of a resin molding apparatus to be used in manufacturing the composite A.

The resin molding apparatus is an apparatus that performs insert molding utilizing injection compression molding or injection molding. Note that, the metal plate B in FIG. 5 and FIG. 6 is vertically inverted relative to that illustrated in FIG. 1 to FIG. 4.

The resin molding apparatus includes one mold (lower mold) 101 to which the metal plate B is set, and another mold (upper mold) 102 that conforms to the one mold 101, the one mold 101 and the other mold 102 being openable/closable. In the illustration, the one mold 101 is a fixed mold, and the other mold 102 is a movable mold that can be raised and lowered.

The one mold 101 forms a first cavity C1 being a formation space for the main portion 5 of the reinforcing member C between the one mold 101 and the preset metal plate B. In addition, the one mold 101 includes a resin supply portion (arrow) 103 for a molten resin at a position corresponding to the body portion 1 of the metal plate B, that is, substantially at a center in the illustration. Although the resin supply portion 103 may be provided at a plurality of positions, all of these resin supply portions 103 are arranged in a range of the body portion 1 of the metal plate B. The other mold 102 forms a second cavity C2 being a formation space for the locking portion 7 between the other mold 102 and the preset metal plate B.

As illustrated in FIG. 5, in performing the injection compression molding with the resin molding apparatus, the metal plate B is set to the one mold 101. At this time, in order to increase strength with which the metal plate B is held in close contact with the resin, at least the inner surface of the body portion 1 has desirably been subjected to surface roughening treatment. Then, in the resin molding apparatus, in a middle of lowering and closing the other mold 102, the molten resin is supplied from the resin supply portion 103. In the injection compression molding, the resin is supplied in the middle of closing the mold so that flowability of the resin is increased.

The molten resin is introduced into the first cavity C1, pressurized between both the molds 101 and 102, and flows to spread from the center toward end portions on the right and the left. Then, as illustrated in FIG. 6, in the resin molding apparatus, the other mold 102 is lowered to close the mold so that the molten resin is pressurized to fill the first cavity C1, and to subsequently fill the second cavity C2 through the holes 3 of the metal plate B.

At this time, in the first cavity C1, the molten resin flows in the direction from the body portion 1 to each of the joint portions 2 (downward direction in FIG. 6). With regard to this flow, the holes 3 and the guide portions 4 are provided in the proximity of the joint portions 2 of the body portion 1 of the metal plate B, and hence the molten resin is introduced preferentially into the holes 3 by the guide portions 4. In this way, the molten resin is reduced in amount of the flow to the joint portions 2 side, and is charged actively into the second cavity C2 through the holes 3.

Next, the resin is cured to form the main portion 5 in the first cavity C1, and to form the locking portions 7 in the second cavity C2. In this way, the cured resin is formed as the reinforcing member C continuously including the main portion 5 that covers the surface on one side of the body portion 1 of the metal plate B, the coupling portions 6 formed respectively in the holes 3, and the locking portions 7 that are formed of the resin that has flowed out onto the surfaces on the other side of the body portion 1 in the boundary regions (internal-angle regions) between the body portion 1 and each of the joint portions 2. Note that, after the resin has been cured, the resin molding apparatus is opened by raising the other mold 102, and the composite A is released.

In the composite A manufactured as described above, the metal plate B and the reinforcing member C2 are integrated in close contact with each other. As illustrated in FIG. 2, most parts of the joint portions 2 except parts covered with the locking portions 7 are exposed, and the guide portions 4 being the rib-shaped protruding portions are not only held in close contact with the main portion 5 of the reinforcing member C but also embedded therein.

With this, even when the composite A is formed by the insert molding, the joint portions 2 are formed reliably in good condition free from adhesion of the resin as parts to be welded to other members, and the composite A has sufficient rigidity owing to the metal plate B and the reinforcing member C integrated therewith. In addition, even when external force is applied to the reinforcing member C, since the locking portions 7 are integrated with the main portion 5 via the coupling portions 6, a risk that the main portion 5 peels off from the metal plate B can be prevented.

Note that, although a part of the main portion 5 is present also on the top side relative to the guide portions 4 in the reinforcing member C illustrated in FIG. 2, in the molding, the guide portions 4 allow the molten resin to be introduced preferentially into the holes 3. With this, the molten resin flows actively into the second cavity C2 through the holes 3. Thus, on the top side relative to the guide portions 4, the molten resin is insufficient, and is unlikely to reach the joint portions 2. Note that, even when the amount of the resin decreases at a part on the top side relative to the guide portions 4, the main portion 5 of the reinforcing member C is formed in a sufficiently wide range. Thus, desired rigidity of the composite A can be secured.

In the composite A described above in this embodiment, the guide portions 4 of the metal plate B are each the protruding portion that is held in contact at least with the rear rim portion of the holes 3 in the direction from the body portion 1 to the joint portions 2. In the insert molding of such a composite A, the guide portions 4 allow the molten resin to be introduced preferentially and further smoothly into the holes 3, thereby further suppressing the molten resin from flowing out to the rear side relative to the holes 3. With this, the joint portions 2 of the composite A are in the good condition free from the adhesion of the resin.

Further, in the composite A, the holes 3 are each a long hole along the continuing direction of the cross-section of the metal plate B. These holes 3 are arranged at the predetermined interval on a straight line, and the guide portions 4 being the rib-shaped protruding portions are provided respectively to the holes 3. In such a composite A, although strength of the metal plate B may be insufficient at a part where the holes 3 are arranged, the rib-shaped guide portions 4 provided respectively to the holes 3 implement a reinforcing function. Thus, even if overall mechanical strength increases, there is no risk that the mechanical strength decrease.

Still further, in the composite A, the holes 3 are arranged at the plurality of positions, and hence the plurality of locking portions 7 are formed as many as the holes 3. Thus, the strength with which the reinforcing member C is held in close contact with the metal plate B is further increased.

Yet further, in the composite A, the main portion 5 of the reinforcing member C is held in close contact with the guide portions 4 of the metal plate B. In a composite including a resin member, the resin of a cover portion is liable to peel off at a boundary between the cover portion made of the resin and an exposed portion. As a countermeasure, in the composite A, the main portion 5 is held in close contact with the guide portions 4 each having the protruding shape (or recessed shape) so that, in the proximity of the boundary, a joint interface between the metal plate B and the reinforcing member C made of the resin is enlarged. With this, the reinforcing member C is suppressed from peeling off.

Yet further, when the composite A includes the plurality of holes 3, the locking portions 7 are formed on the surface on the other side of the metal plate B in a state of linking the coupling portions 6 formed in the plurality of holes 3 to each other as indicated by imaginary lines in FIG. 4. These locking portions 7 each continue in the continuing direction of the cross-section of the metal plate B. In this case, in the resin molding apparatus, the second cavities C2 are continuous with each other.

In the insert molding of such a composite A, when a distribution of the amount of the molten resin to be supplied is non-uniform, the molten resin is charged into the second cavity C2 through the holes 3, and surplus of the molten resin is supplied to the part where the molten resin is insufficient. In this way, the molten resin spreads all over the second cavity C2. With this, the molten resin is prevented from flowing to the side where the joint portions 2 are provided, and the molten resin is prevented from leaking onto the joint portions 2.

Yet further, in the composite A, the joint portions 2 of the metal plate B each continuously protrude from one end of the body portion 1 to the side of the surface on the other side (outer surface side), and the locking portions 7 of the reinforcing member C are each formed in the internal-angle region between the body portion 1 and the joint portions 2. In such a composite A, the locking portions 7 implement the function to reinforce the joint portions 2, specifically, as indicated by an arrow in FIG. 2, mechanical strength against force to bend the joint portion 2 to the downward direction (internal-angle direction) can be increased.

Yet further, in the composite A, only by checking how the locking portions 7 have been formed, how much the surplus of the resin is can be easily determined. The determination of the amount of the resin can be utilized for adjusting an amount of the resin in subsequent insert molding. In addition, the second cavity C2 being the formation space for the locking portions 7 is a part to be filled last with the molten resin, and hence are suited to arrangement of an exhaust passage. Thus, setting of the exhaust passage is facilitated.

Yet further, in the composite A, the locking portions 7 of the reinforcing member C are each formed into the triangular cross-sectional shape with the two sides corresponding respectively to the body portion 1 side of the metal plate 1 and the joint portions 2 side of the same. In the reinforcing member C of such a composite A, an area in which the locking portions 7 are held in contact with the metal plate B can be sufficiently secured even by a small amount of the resin. Reduction in amount of the resin can contribute to further weight reduction of the composite A.

Now, with reference to FIG. 7 to FIG. 23, composites according to a second embodiment to a fifteenth embodiment of the present invention are described. Note that, in the following embodiments, components equivalent to those of the first embodiment are denoted by the same reference symbols to omit detailed description.

Second Embodiment

Figure 7:
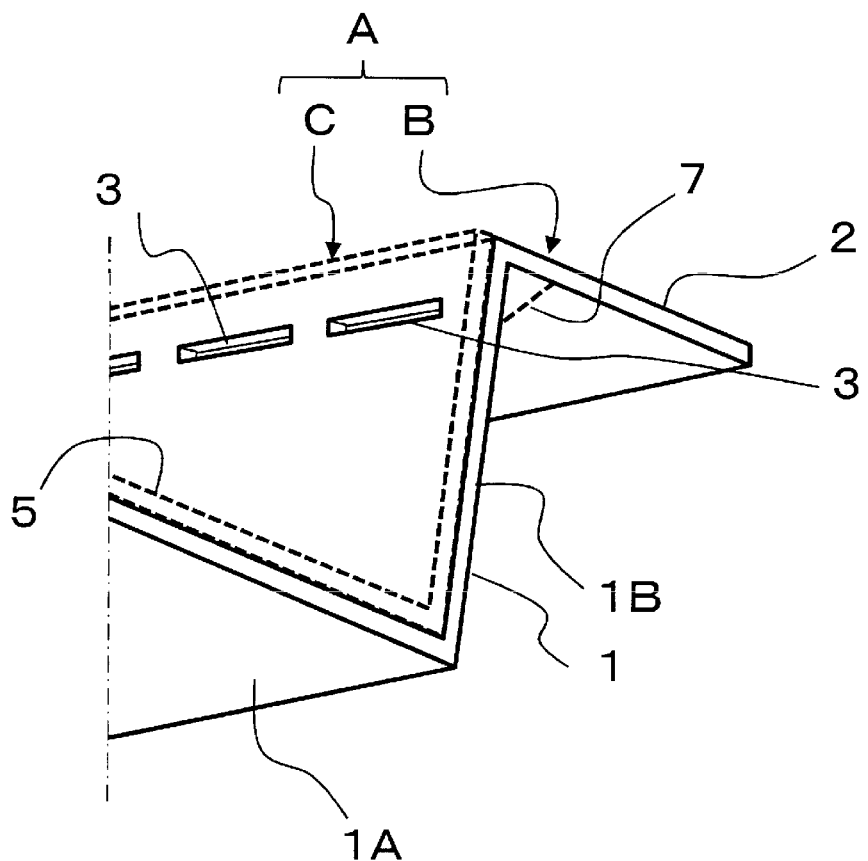
FIG. 7 is an explanatory perspective view of a composite according to a second embodiment of the present invention.
Figure 8:
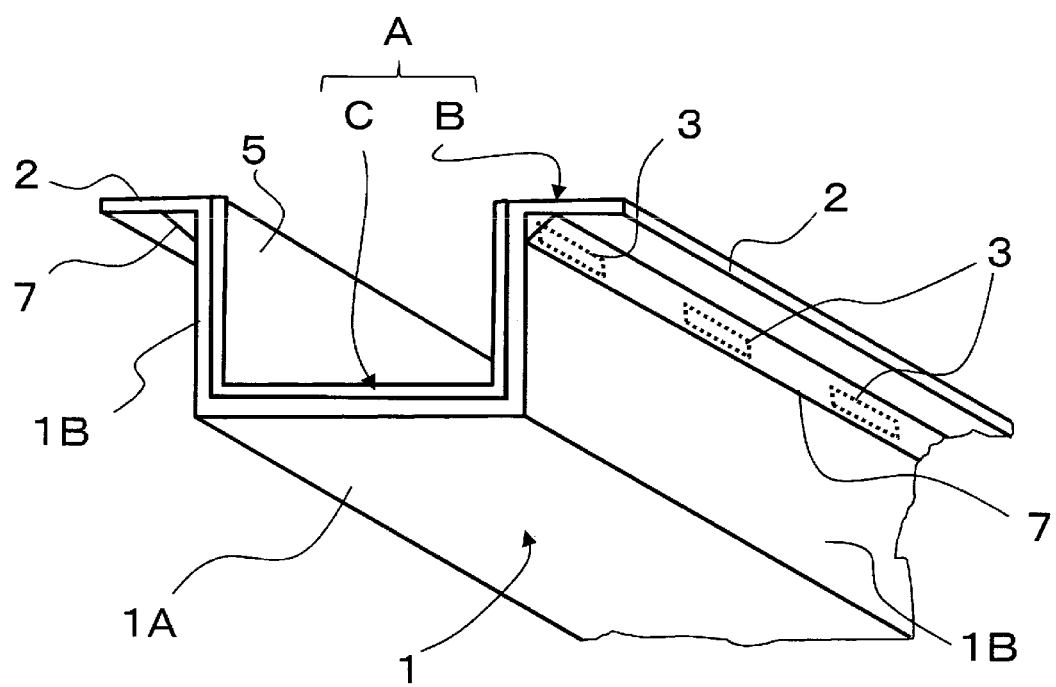
FIG. 8 is a perspective view of the composite illustrated in FIG. 7.

In the composite A illustrated in FIG. 7 and FIG. 8, the metal plate B includes the plurality of holes 3 each being the long hole, and the locking portions 7 of the reinforcing member C are formed respectively on the surface on the other side of the metal plate B in the state of linking the coupling portions 6 formed in the plurality of holes 3 to each other. The metal plate B of this composite A does not include the guide portions (4) described in the first embodiment.

In the insert molding of this composite A, the molten resin is introduced through the plurality of holes 3 preferentially onto the side of the surfaces on the other side of the body portion 1 (outer surface side). In addition, in the insert molding of the composite A, when the distribution of the amount of the molten resin to be supplied is non-uniform, the surplus of the molten resin is supplied to the part where the molten resin is insufficient. In this way, the molten resin spreads all over the second cavity C2. With this, the joint portions 2 of the composite A are in the good condition free from the adhesion of the resin. In addition, the main portion 5, the plurality of coupling portions 6, and the locking portions 7 common to the coupling portions 6 are continuous with each other. In this way, the metal plate B and the reinforcing member C are closely integrated with each other, and the composite A has the sufficient rigidity.

Third Embodiment

Figure 9:
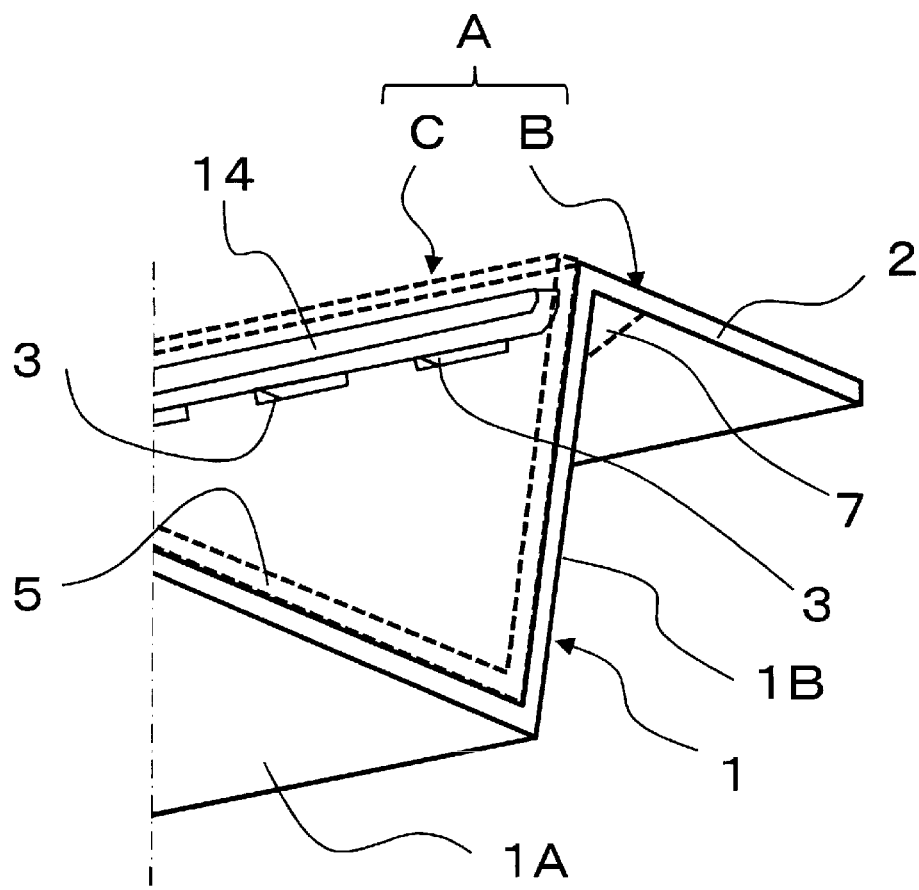
FIG. 9 is an explanatory perspective view of a composite according to a third embodiment of the present invention.
Figure 10:
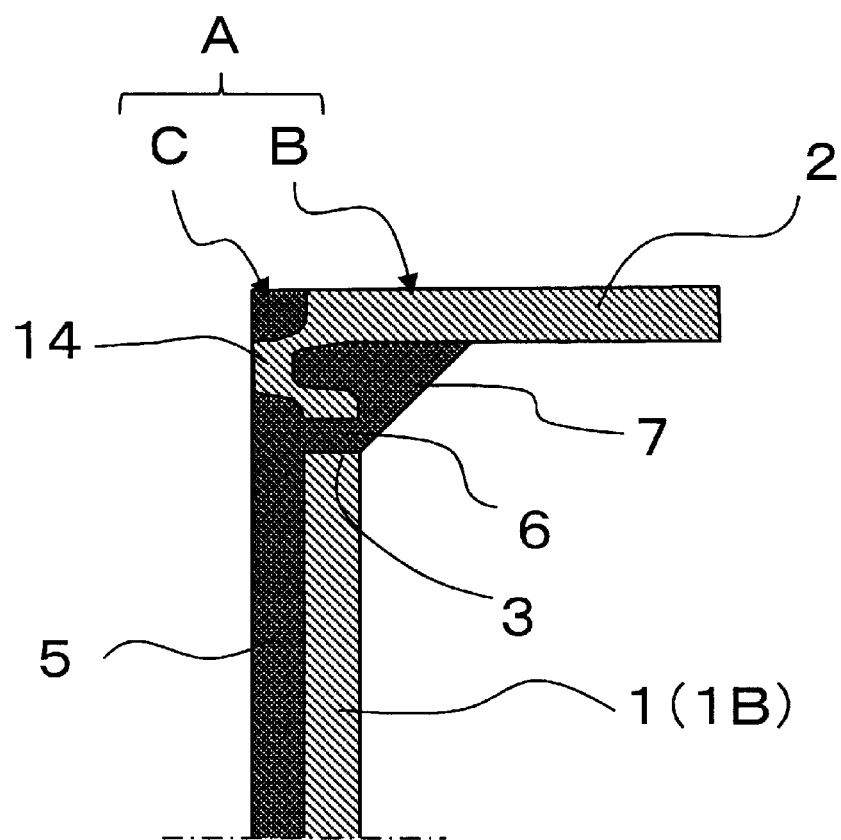
FIG. 10 is a main-part cross-sectional view of the composite illustrated in FIG. 9.

In the composite A illustrated in FIG. 9 and FIG. 10, the metal plate B includes the plurality of holes 3 each being a long hole, and a guide portion 14 on the rear side relative to the holes 3 in the direction from the body portion 1 of the metal plate B to the joint portions 2 of the same (flowing direction of the resin). The guide portion 14 in the illustration is a rib-shaped protruding portion that continues in the continuing direction of the cross-section of the metal plate B. In other words, the guide portion 14 is formed along a longitudinal direction of the metal plate B. The holes 3 and the guide portion 14 can be formed by the press working.

The composite A is capable of providing advantages similar to those of the foregoing embodiments. Further, the guide portion 4 of the composite A is capable of promoting action to introduce the molten resin preferentially into the holes 3, and the molten resin can be further reliably prevented from leaking to the joint portions 2 side. Still further, the rib-shaped guide portion 4 formed along the longitudinal direction of the metal plate B is capable of increasing the mechanical strength of the composite A, and hence is capable of contributing to an increase in rigidity.

Fourth Embodiment

Figure 11:
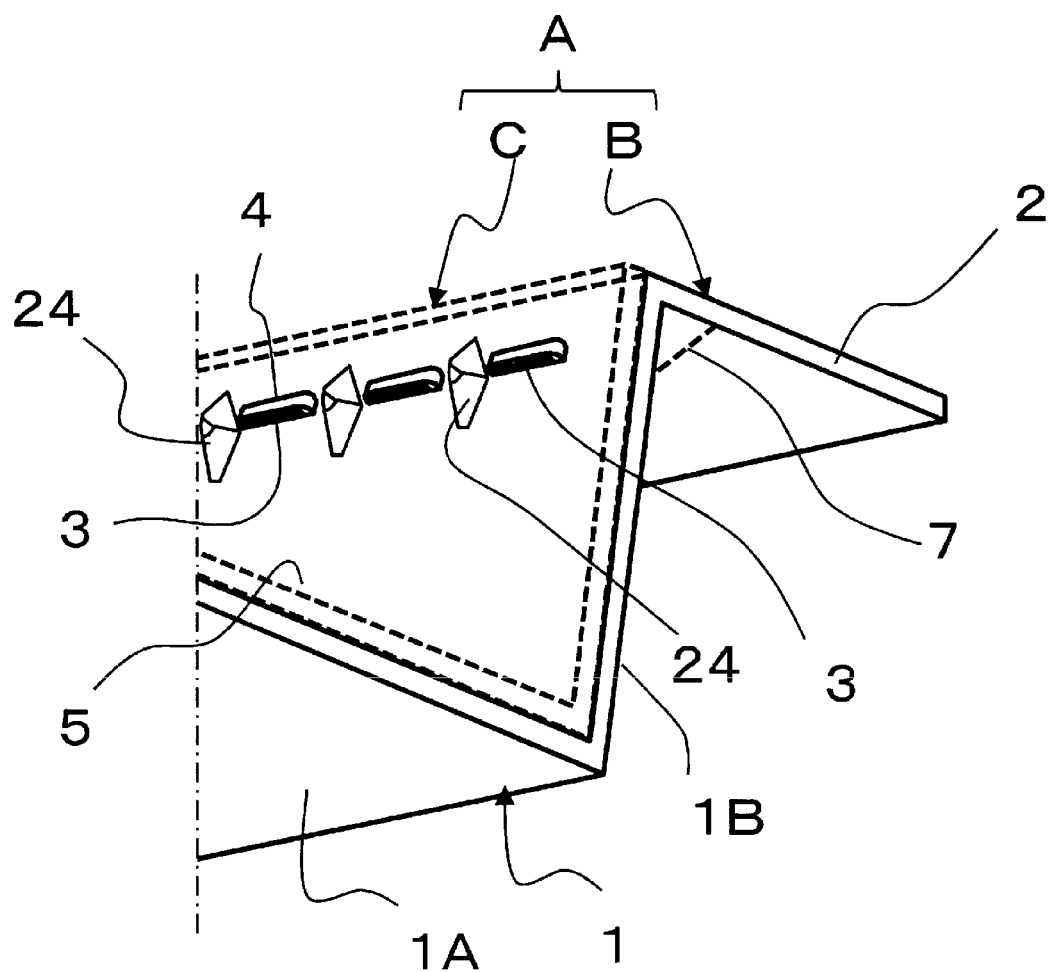
FIG. 11 is an explanatory perspective view of a composite according to a fourth embodiment of the present invention.
Figure 12:
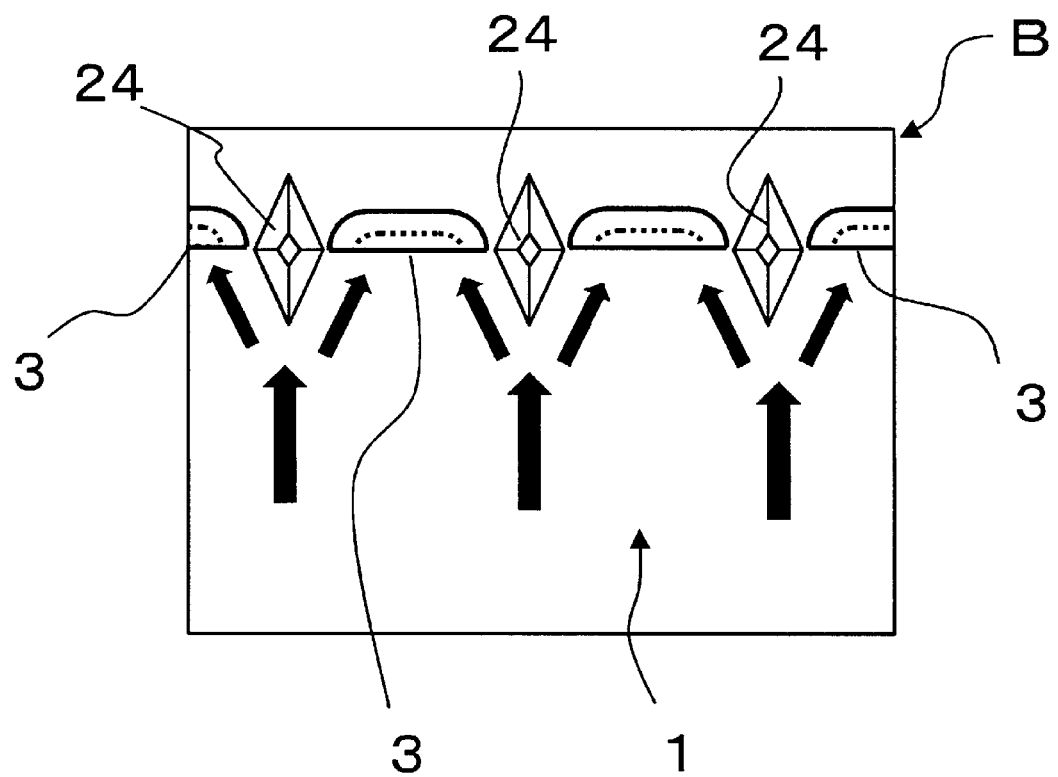
FIG. 12 is a main-part front view of the composite illustrated in FIG. 11.

In the composite A illustrated in FIG. 11 and FIG. 12, the metal plate B includes the plurality of holes 3 each being a long hole, the guide portions 4 on the rear side relative to the holes 3 in the direction from the body portion 1 of the metal plate B to the joint portions 2 of the same (flowing direction of the resin), and another guide portion 24 on at least one side relative to each of the holes 3.

The guide portions 4 provided on the rear side relative to the holes 3 are similar to the rib-shaped protruding portions described in the first embodiment. The guide portion 24 provided on the one side relative to each of the holes 3 is a protruding portion having a narrow quadrangular-pyramidal shape. Note that, in this embodiment, since the plurality of holes 3 are arranged, the guide portion 24 is arranged on one side relative to the holes 3 located at the end portions, and the guide portions 24 are arranged on both sides relative to the other holes 3. The guide portions 24 may be arranged on both a right-hand side and a left-hand side relative to the holes 3 located at the end portions.

In the insert molding of the composite A, as indicated by arrows in FIG. 12, the guide portions 4 and 24 allow the molten resin to be introduced preferentially and smoothly into the holes 3, thereby preventing the molten resin from leaking to the joint portions 2 side. With this, the joint portions 2 of the composite A can be formed reliably in the good condition free from the adhesion of the resin, and the composite A can have the sufficient rigidity owing to the reinforcing member C.

Fifth Embodiment

Figure 13:
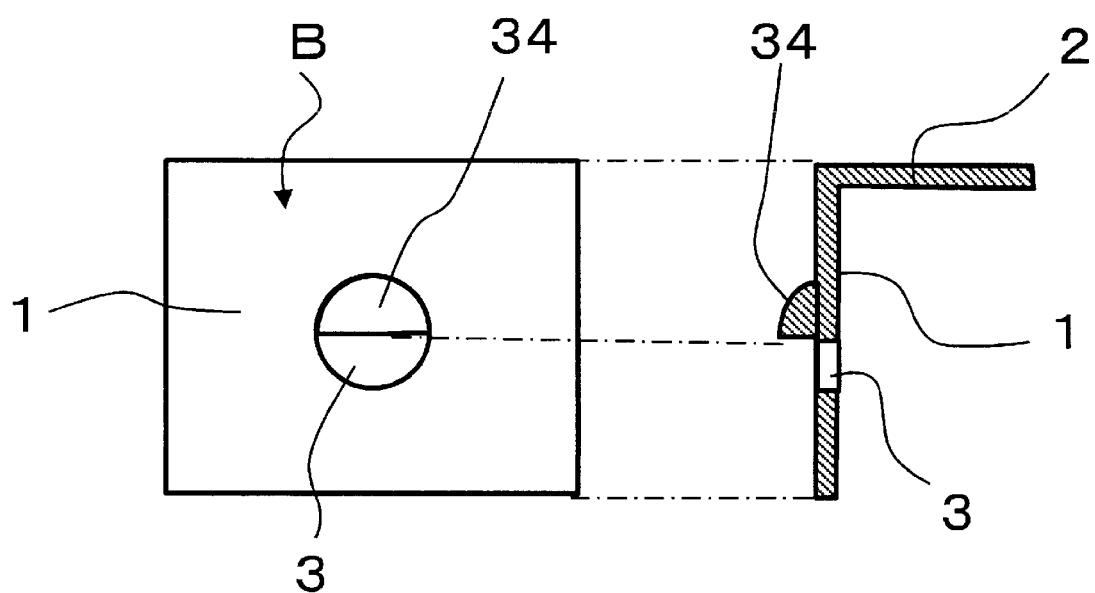
FIG. 13 is an explanatory front and cross-sectional view of a hole and a guide portion of a fifth embodiment.

As understood from a main part of the metal plate B illustrated in FIG. 13, the hole 3 of the composite according to this embodiment has a semicircular shape in a plan view, and the composite includes a guide portion 34 being a protruding portion having a circular shape in a plan view at the rear rim portion of the hole 3 in the direction from the body portion 1 to the joint portions 2 (flowing direction of the resin). The hole 3 and the guide portion 34 have a circular shape as a whole in a plan view.

As in the foregoing embodiments, in the insert molding of this composite A, the guide portion 34 allows the molten resin to be introduced preferentially into the hole 3, thereby preventing the molten resin from leaking to the joint portions 2 side. With this, the joint portions 2 of the composite A can be formed reliably in the good condition free from the adhesion of the resin, and the composite A can have the sufficient rigidity owing to the reinforcing member C.

Sixth Embodiment

Figure 14:
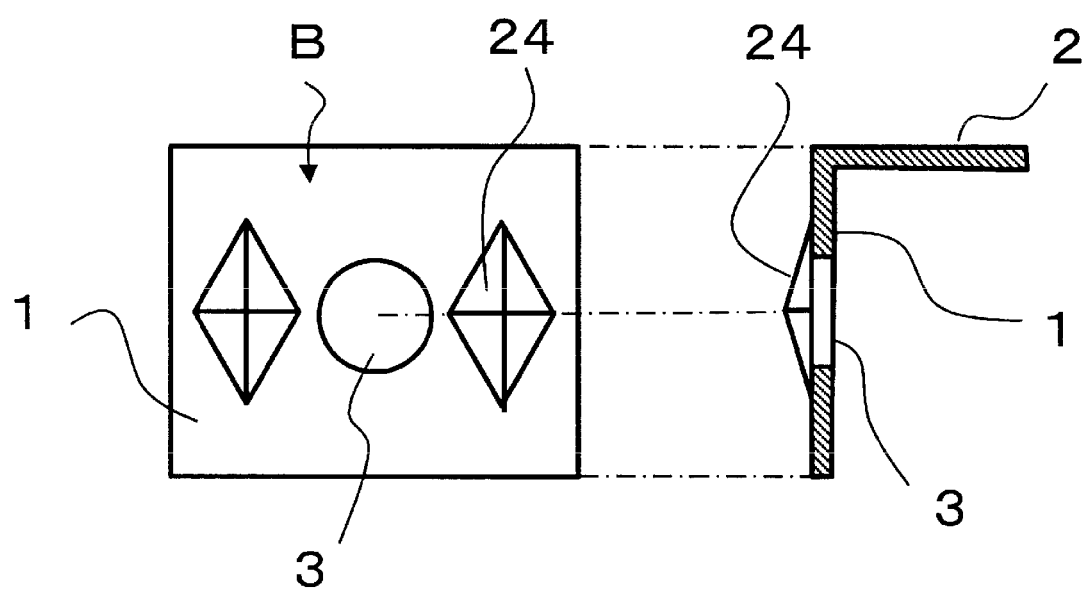
FIG. 14 is an explanatory front and cross-sectional view of a hole and guide portions of a sixth embodiment.

As understood from a main part of the metal plate B illustrated in FIG. 14, the hole 3 of the composite according to this embodiment has a circular shape in a plan view, and the composite includes the guide portions 14 each being the protruding portion having the narrow quadrangular-pyramidal shape on both the right-hand side and the left-hand side relative to the hole 3 in the direction from the body portion 1 to the joint portions 2 (flowing direction of the resin).

As in the fourth embodiment (refer to FIG. 11 and FIG. 12), in the insert molding of this composite A, the guide portions 14 allow the molten resin to be introduced preferentially into the hole 3, thereby preventing the molten resin from leaking to the joint portions 2 side. With this, the joint portions 2 of the composite A can be formed reliably in the good condition free from the adhesion of the resin, and the composite A can have the sufficient rigidity owing to the reinforcing member C.

Seventh Embodiment

Figure 15:
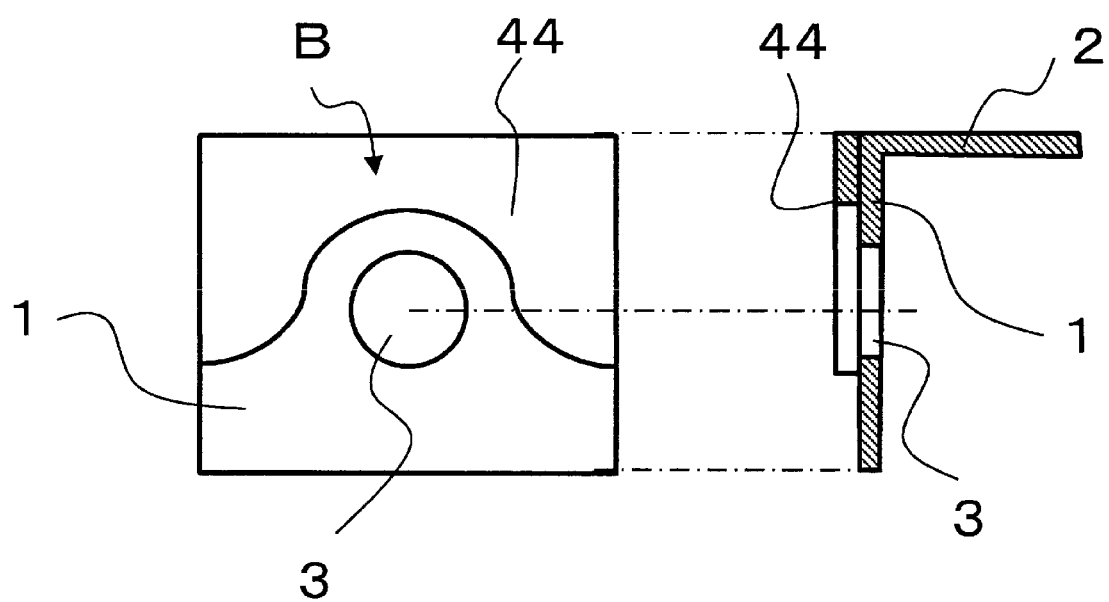
FIG. 15 is an explanatory front and cross-sectional view of a hole and a guide portion of a seventh embodiment.

As understood from a main part of the metal plate B illustrated in FIG. 15, the hole 3 of the composite according to this embodiment has the circular shape in a plan view, and the composite includes a guide portion 44 being a protruding portion formed by swelling a surface of the body portion 1 on the rear side and both the right-hand side and the left-hand side relative to the hole 3 in the direction from the body portion 1 to the joint portions 2 (flowing direction of the resin). The guide portion 344 surrounds a side corresponding to rear half of a circumference of the hole 3.

In the insert molding of this composite A, the guide portion 44 allows the molten resin to be introduced preferentially into the hole 3, thereby preventing the molten resin from leaking to the joint portions 2 side. With this, the joint portions 2 of the composite A can be formed reliably in the good condition free from the adhesion of the resin, and the composite A can have the sufficient rigidity owing to the reinforcing member C.

Eighth Embodiment

Figure 16:
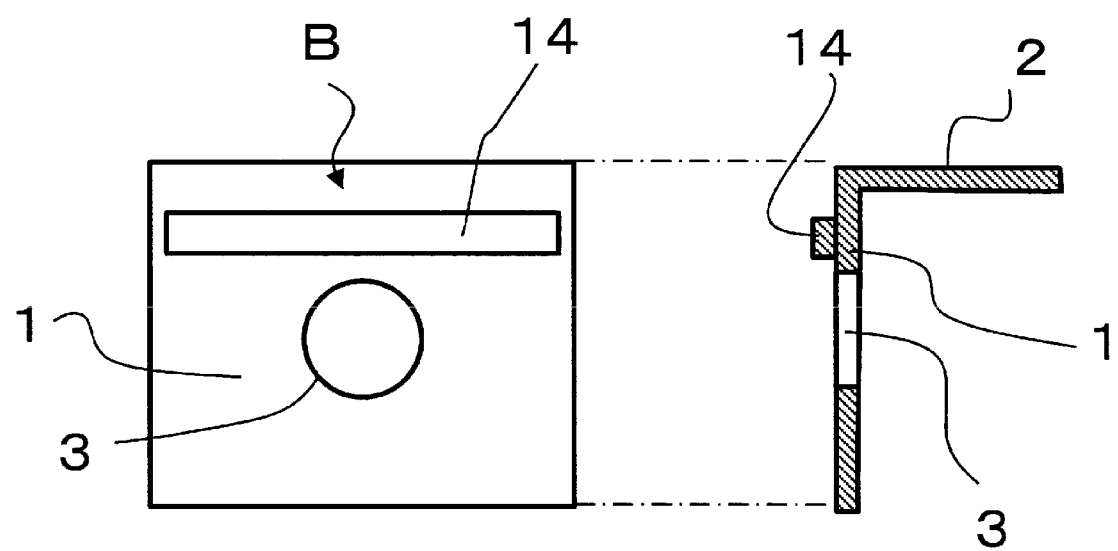
FIG. 16 is an explanatory front and cross-sectional view of a hole and a guide portion of an eighth embodiment.

As understood from a main part of the metal plate B illustrated in FIG. 16, the hole 3 of the composite according to this embodiment has the circular shape in a plan view, and the composite includes the guide portion 14 being the rib-like protrusion that continues in the continuing direction of the cross-section of the body portion 1 on the rear side relative to the hole 3 in the direction from the body portion 1 to the joint portions 2 (flowing direction of the resin).

In the insert molding of this composite A, the guide portion 14 allows the molten resin to be introduced preferentially into the hole 3, thereby preventing the molten resin from leaking to the joint portions 2 side. With this, the joint portions 2 of the composite A can be formed reliably in the good condition free from the adhesion of the resin, and the composite A can have the sufficient rigidity owing to the reinforcing member C.

Ninth Embodiment

Figure 17:
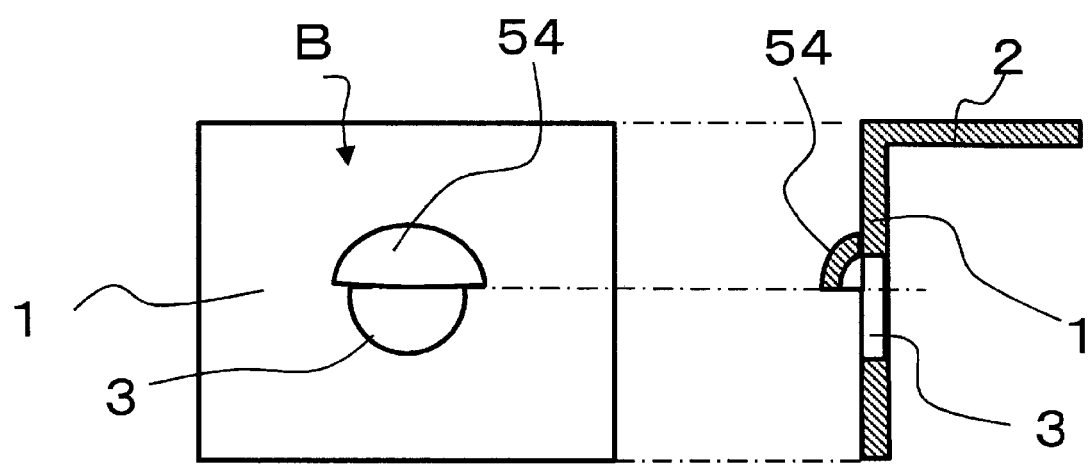
FIG. 17 is an explanatory front and cross-sectional view of a hole and a guide portion of a ninth embodiment.

As understood from a main part of the metal plate B illustrated in FIG. 17, the hole 3 of the composite according to this embodiment has the circular shape in a plan view, and the composite includes a guide portion 54 being the protruding portion that continues in the continuing direction of the cross-section of the body portion 1 on the rear side relative to the hole 3 in the direction from the body portion 1 to the joint portions 2 (flowing direction of the resin). The guide portion 54 protrudes to cover rear half of the hole 3 in a plan view.

In the insert molding of this composite A, the guide portion 54 allows the molten resin to be introduced preferentially into the hole 3, thereby preventing the molten resin from leaking to the joint portions 2 side. With this, the joint portions 2 of the composite A can be formed reliably in the good condition free from the adhesion of the resin, and the composite A can have the sufficient rigidity owing to the reinforcing member C.

Tenth Embodiment

Figure 18:
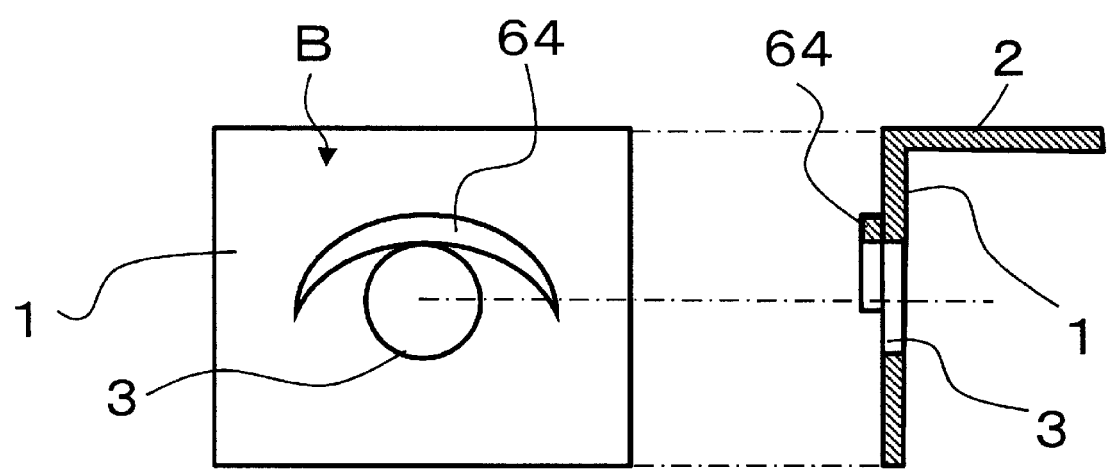
FIG. 18 is an explanatory front and cross-sectional view of a hole and a guide portion of a tenth embodiment.

As understood from a main part of the metal plate B illustrated in FIG. 18, the hole 3 of the composite according to this embodiment has the circular shape in a plan view, and the composite includes a guide portion 64 being a protruding portion having a crescentic shape in a plan view on the rear side and both the right-hand side and the left-hand side relative to the hole 3 in the direction from the body portion 1 to the joint portions 2 (flowing direction of the resin). The guide portion 54 surrounds the rear half of the hole 3 in a plan view.

In the insert molding of this composite A, the guide portion 64 allows the molten resin to be introduced preferentially into the hole 3, thereby preventing the molten resin from leaking to the joint portions 2 side. With this, the joint portions 2 of the composite A can be formed reliably in the good condition free from the adhesion of the resin, and the composite A can have the sufficient rigidity owing to the reinforcing member C.

Eleventh Embodiment

Figure 19:
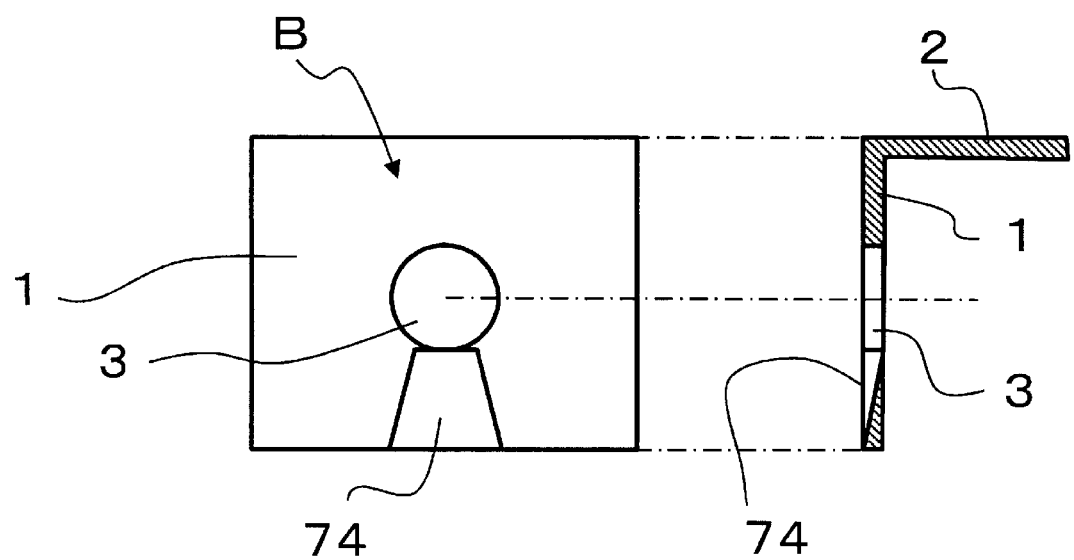
FIG. 19 is an explanatory front and cross-sectional view of a hole and a guide portion of an eleventh embodiment.

As understood from a main part of the metal plate B illustrated in FIG. 19, the hole 3 of the composite according to this embodiment has the circular shape in a plan view, and the composite includes a guide portion 74 being the recessed portion extended from the front side relative to the hole 3 into the hole 3 in the direction from the body portion 1 to the joint portions 2 (flowing direction of the resin). This guide portion 74 gradually decreases in width towards the hole 3, and includes a bottom portion having a downward gradient towards the hole 3 as illustrated in a cross-section on a right-hand side in FIG. 19. With this, the guide portion 74 allows the molten resin to further smoothly flow.

In the insert molding of this composite A, the guide portion 74 allows the molten resin to be introduced preferentially into the hole 3, thereby preventing the molten resin from leaking to the joint portions 2 side. With this, the joint portions 2 of the composite A can be formed reliably in the good condition free from the adhesion of the resin, and the composite A can have the sufficient rigidity owing to the reinforcing member C.

Twelfth Embodiment

Figure 20:
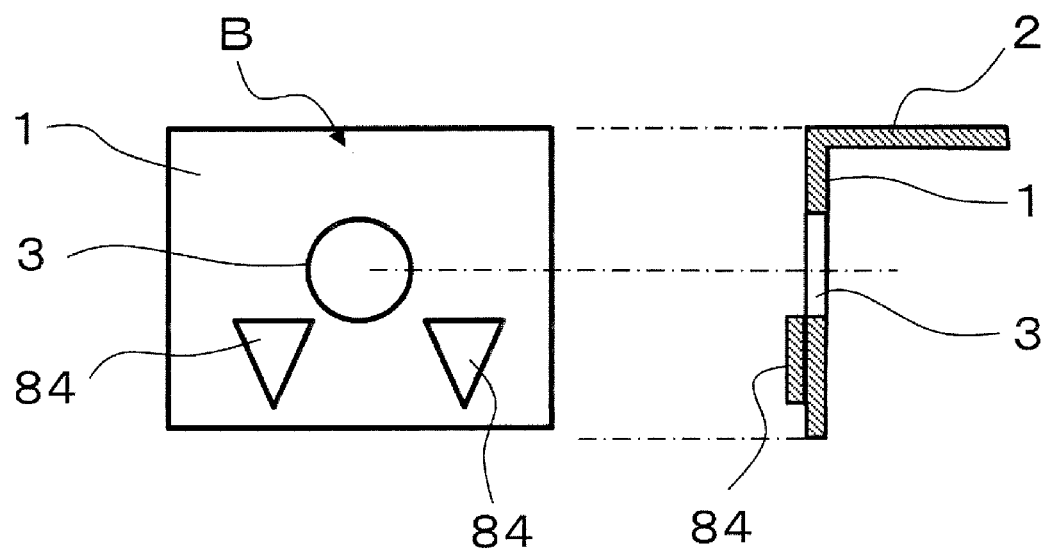
FIG. 20 is an explanatory front and cross-sectional view of a hole and a guide portion of a twelfth embodiment.

As understood from a main part of the metal plate B illustrated in FIG. 20, the hole 3 of the composite according to this embodiment has the circular shape in a plan view, and the composite includes guide portions 84 and 84 each being a protruding portion having a triangular shape in a plan view on both the right-hand side and the left-hand side relative to the hole 3 in the direction from the body portion 1 to the joint portions 2 (flowing direction of the resin). The guide portions 84 in the illustration are provided on both the right-hand side and the left-hand side relative to the hole 3 and on the front side relative to the hole 3 in an arrangement where their vertices are oriented against the flowing direction of the resin.

As in the fourth embodiment (refer to FIG. 11 and FIG. 12), in the insert molding of this composite A, the guide portions 84 allow the molten resin to be introduced preferentially into the hole 3, thereby preventing the molten resin from leaking to the side where the joint portions 2 are provided. With this, the joint portions 2 of the composite A can be formed reliably in the good condition free from the adhesion of the resin, and the composite A can have the sufficient rigidity owing to the reinforcing member C.

Note that, in each of the foregoing fifth embodiment to the foregoing twelfth embodiment, the hole 3 has the semicircular shape or the circular shape. When the hole 3 has a shape including a circular arc, the molten resin can be further smoothly introduced. Further, when the hole 3 is molded together with the guide portion 14, 24, 34, 44, 54, 64, 74, or 84 by press working, the hole 3 may be formed into the shape including the circular arc. With this, the hole 3 can be formed with high accuracy while the metal plate B is prevented from cracking.

Still further, as described in the fifth embodiment, the ninth embodiment, and the tenth embodiment (FIG. 13, FIG. 17, and FIG. 18), by arranging the guide portion so that the guide portion is held in contact with the rear rim portion of the hole 3, the guide portion is allowed to introduce the molten resin preferentially and further smoothly into the hole 3.

In addition, in the foregoing fifth embodiment to the foregoing twelfth embodiment, the hole 3 and each of the guide portions 14, 24, 34, 44, 54, 64, 74, and 84 may be formed by press working. Although a thickness is illustrated on an exaggerated scale at the position of the guide portion being the protruding portion in the cross-section on the right-hand side of each of the figures, an entirety of the metal plate B, including the guide portion, may be formed to have a uniform thickness.

Thirteenth Embodiment and Fourteenth Embodiment

Figure 21:
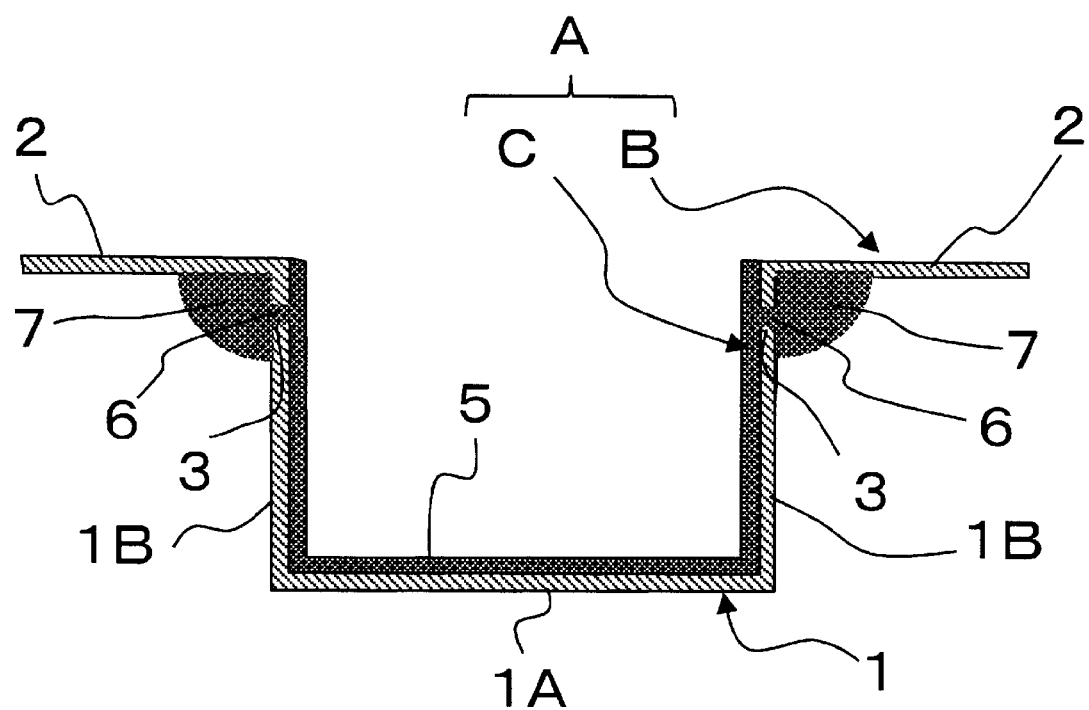
FIG. 21 is an explanatory cross-sectional view of a composite according to a thirteenth embodiment.
Figure 22:
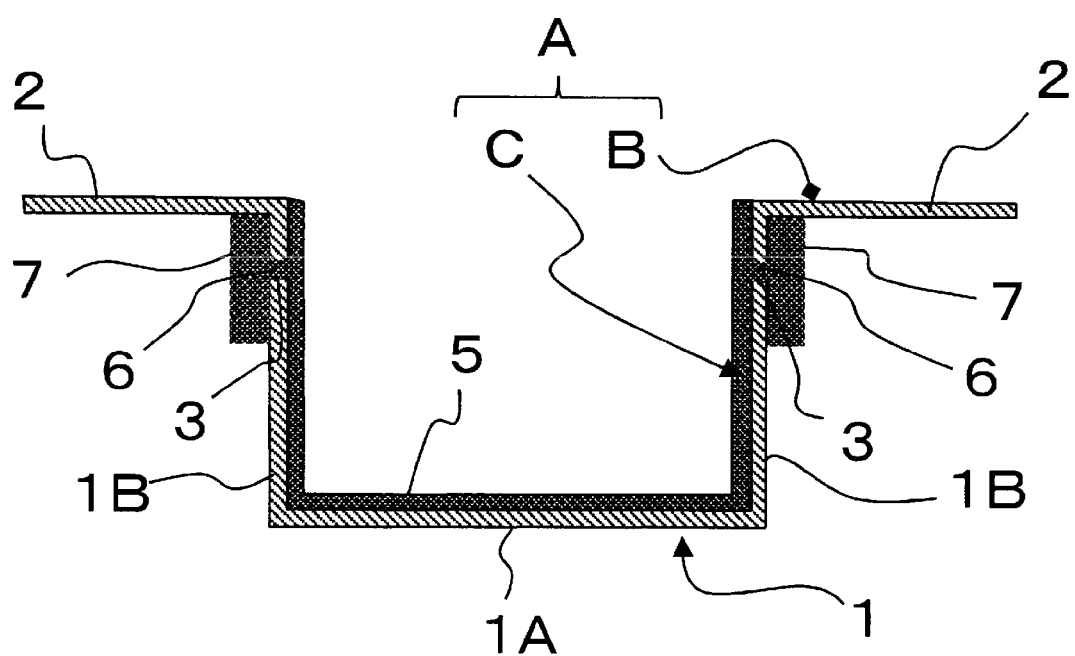
FIG. 22 is an explanatory cross-sectional view of a composite according to a fourteenth embodiment.

As illustrated in FIG. 21, the locking portions 7 of the composite A according to the thirteenth embodiment each have a quadrant cross-sectional shape. In addition, as illustrated in FIG. 22, the locking portions 7 of the composite A according to the fourteenth embodiment each have a rectangular cross-sectional shape. In this way, in the composite A, the locking portions 7 of the reinforcing member C may be formed into various cross-sectional shapes. In other words, in any case, the locking portions 7 are capable of exerting high joint strength of the reinforcing member C with respect to the metal plate B, and hence are capable of contributing to securement of the rigidity of the composite A.

Fifteenth Embodiment

Figure 23:
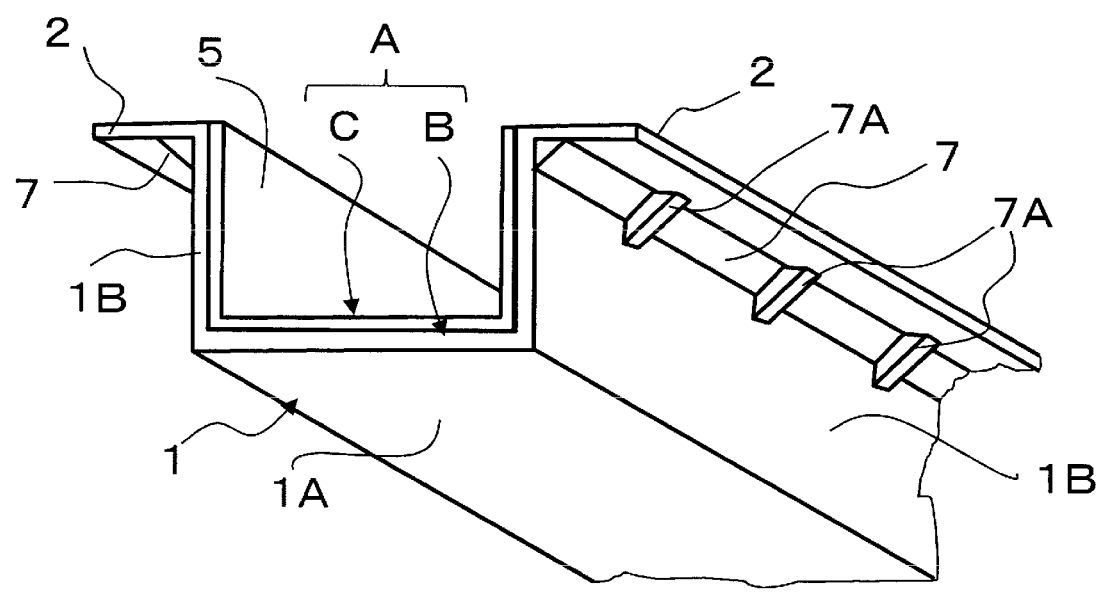
FIG. 23 is an explanatory perspective view of a composite according to a fifteenth embodiment.

The locking portions 7 of the composite A illustrated in FIG. 23 each continue in the continuing direction of the cross-section of the metal plate B, and the locking portions 7 each have the triangular cross-sectional shape with the two sides corresponding respectively to the body portion 1 side and the joint portion 2 side. In addition, the locking portions 7 each include, at a predetermined interval and integrally, ribs 7A each extending from the body portion 1 to the joint portions 2, on the outer surface of the locking portions 7. In this way, the locking portions 7 may each have a structure that partially varies in their cross-sectional shape.

This composite A is capable of providing the advantages similar to those of the foregoing embodiments. In addition, the function to reinforce the joint portions 2 is enhanced by the locking portions 7 including the ribs 7A. With this, the mechanical strength of the composite A against the force to bend the joint portions 2 towards the downward direction (internal-angle direction) can be increased, and the composite A can be rigidly joined to other members via the joint portions 2.

Configurations of the composite according to the present invention are not limited to those of the foregoing embodiments, and may be changed as appropriate within the gist of the present invention. Alternatively, the configurations of the embodiments may be combined with each other.

REFERENCE SIGNS LIST

A Composite
B Metal plate

C Reinforcing member
C1 First cavity
C2 Second cavity
1 Body portion
2 Joint portion
3 Hole
4 Guide portion
5 Main portion
6 Coupling portion
7 Locking portion
14 Guide portion
24 Guide portion
34 Guide portion
44 Guide portion
54 Guide portion
64 Guide portion
74 Guide portion
84 Guide portion
101 One mold
102 Another mold
103 Resin supply portion

The invention claimed is:
1. A composite comprising
a layered structure comprising:
a metal plate comprising:
a body portion having a first surface, and a second surface opposite the first surface,
a joint portion that is continuous with an upper end of the body portion and protrudes from the second surface in a direction away from the first surface,
a hole that extends through the body portion from the first surface to the second surface, and
a guide portion located at an edge of the hole; and
a reinforcing member that is made of a resin and comprises:
a main portion that covers the first surface of the body portion,
a coupling portion formed in the hole, and
a locking portion that directly contacts the second surface of the body portion and a lower surface of the joint portion;
the guide portion comprises a recessed portion that is recessed into the first surface of the body portion at the edge of the hole on a lower side of the hole.
2. The composite according to claim 1, wherein:
the coupling portion is one of a plurality of coupling portions;
the hole is one of a plurality of holes located at a plurality of positions along the joint portion;
the locking portion links the coupling portions formed in the plurality of holes to each other.
3. The composite according to claim 2, wherein the main portion of the reinforcing member directly contacts the guide portion of the metal plate.
4. The composite according to claim 1, wherein the main portion of the reinforcing member directly contacts the guide portion of the metal plate.
5. The composite according to claim 1, wherein the hole of the metal plate has a shape including a circular arc.
6. The composite according to claim 1, wherein the locking portion of the reinforcing member has a triangular cross-sectional shape with two sides corresponding respectively to the second surface of the body portion of the metal plate and the lower surface of the joint portion of the metal plate.
7. The composite according to claim 1, wherein an entirety of the recessed portion is below the lower side of the hole.
8. The composite according to claim 1, wherein the recessed portion has a width that decreases toward the hole.
9. A composite comprising:
a layered structure comprising:
a metal plate comprising:
a body portion having a first surface, and a second surface opposite the first surface,
a joint portion that is continuous with an upper end of the body portion,
a plurality of holes that are arranged at a plurality of positions along the joint portion and extend through the body portion from the first surface to the second surface, and
a plurality of guide portions, each extending at least partially around a respective one of the holes; and
a reinforcing member that is made of a resin and comprises:
a main portion that covers the first surface of the body portion,
a plurality of coupling portions, each formed in a respective one of the holes, and
a locking portion that contacts the second surface of the body portion and a lower surface of the joint portion, and extends linearly along an edge formed between the second surface of the body portion and the lower surface of the joint portion, and links the plurality of coupling portions.
10. The composite according to claim 9, wherein at least one of the holes of the metal plate has a shape including a circular arc.
11. The composite according to claim 9, wherein the locking portion of the reinforcing member has a triangular cross-sectional shape with two sides corresponding respectively to the second surface of the body portion of the metal plate and a lower surface of the joint portion of the metal plate.
12. A composite comprising
a layered structure comprising:
a metal plate comprising:
a body portion having a first surface, and a second surface opposite the first surface,
a joint portion that is continuous with an upper end of the body portion and protrudes from the second surface in a direction away from the first surface,
a hole that extends through the body portion from the first surface to the second surface, and
a guide portion located at an edge of the hole; and
a reinforcing member that is made of a resin and comprises:
a main portion that covers the first surface of the body portion,
a coupling portion formed in the hole, and
a locking portion that directly contacts the second surface of the body portion and a lower surface of the joint portion;
the guide portion comprises a protruding portion that protrudes from the first surface of the body portion at the edge of the hole only on at least one of a an upper side or a lateral side of the hole.
13. The composite according to claim 12, wherein:
the coupling portion is one of a plurality of coupling portions;
the hole is one of a plurality of holes located at a plurality of positions along the joint portion;

the locking portion links the coupling portions formed in the plurality of holes to each other.

14. The composite according to claim 13, wherein the main portion of the reinforcing member directly contacts the guide portion of the metal plate.

15. The composite according to claim 12, wherein the main portion of the reinforcing member directly contacts the guide portion of the metal plate.

16. The composite according to claim 12, wherein the hole of the metal plate has a shape including a circular arc.

17. The composite according to claim 12, wherein the locking portion of the reinforcing member has a triangular cross-sectional shape with two sides corresponding respectively to the second surface of the body portion of the metal plate and the lower surface of the joint portion of the metal plate.

\* \* \* \* \*